(12) United States Patent
Ishimori et al.

(10) Patent No.: US 10,520,585 B2
(45) Date of Patent: Dec. 31, 2019

(54) RADAR DEVICE AND SIGNAL PROCESSING METHOD

(71) Applicant: FUJITSU TEN LIMITED, Kobe-shi, Hyogo (JP)

(72) Inventors: Hiroyuki Ishimori, Kobe (JP); Daisuke Nishio, Kobe (JP)

(73) Assignee: FUJITSU TEN Limited, Kobe (JP)

( * ) Notice: Subject to any disclaimer, the term of this patent is extended or adjusted under 35 U.S.C. 154(b) by 325 days.

(21) Appl. No.: 15/602,545

(22) Filed: May 23, 2017

(65) Prior Publication Data

US 2017/0363717 A1    Dec. 21, 2017

(30) Foreign Application Priority Data

Jun. 21, 2016 (JP) ................................. 2016-122935

(51) Int. Cl.
*G01S 7/35* (2006.01)
*G01S 13/34* (2006.01)
*G01S 13/93* (2006.01)

(52) U.S. Cl.
CPC ............ *G01S 7/354* (2013.01); *G01S 13/341* (2013.01); *G01S 13/931* (2013.01); *G01S 2007/356* (2013.01)

(58) Field of Classification Search
CPC ...... G01S 7/354; G01S 13/341; G01S 13/931; G01S 2007/356
See application file for complete search history.

(56) References Cited

U.S. PATENT DOCUMENTS

| | | | | |
|---|---|---|---|---|
| 8,638,254 B2 * | 1/2014 | Itoh | ...................... | G01S 13/345 342/128 |
| 2003/0122703 A1 * | 7/2003 | Kishida | ................. | G01S 13/345 342/70 |
| 2011/0006941 A1 * | 1/2011 | Samukawa | ........... | G01S 13/345 342/70 |
| 2011/0074622 A1 * | 3/2011 | Shibata | ................. | G01S 13/345 342/90 |

(Continued)

FOREIGN PATENT DOCUMENTS

| | | |
|---|---|---|
| JP | 2003-177178 A | 6/2003 |
| JP | 2004-132734 A | 4/2004 |

(Continued)

*Primary Examiner* — Frank J McGue
(74) *Attorney, Agent, or Firm* — Oliff PLC

(57) ABSTRACT

There is provided a radar device. An estimating unit estimates peak signals corresponding to a target in the latest periods of each of UP and DOWN beat sections of a beat signal on the basis of histories of peak signals corresponding to the target in past periods of the UP and DOWN beat sections. A pairing unit extracts peak signals within predetermined ranges defined with reference to the estimate peak signals on the basis of the histories, and pairs the extracted peak signals. In a case where a distance to the target is equal to or shorter than a predetermined value, the pairing unit extracts peak signals corresponding to the target, from a first range which is a predetermined angular range defined with reference to the estimate peak signals, or a second range which is a predetermined transverse position range defined with reference to the estimate peak signals.

7 Claims, 8 Drawing Sheets

UP SECTION

DOWN SECTION (56) References Cited

U.S. PATENT DOCUMENTS

| | | | |
|---|---|---|---|
| 2011/0282620 A1* | 11/2011 | Sakuraoka | G01C 21/12 |
| | | | 702/141 |
| 2013/0222176 A1* | 8/2013 | Ishimori | G01S 13/345 |
| | | | 342/70 |
| 2015/0204971 A1* | 7/2015 | Yoshimura | G01S 13/345 |
| | | | 342/70 |
| 2017/0082744 A1* | 3/2017 | Matsumoto | G01S 7/352 |

FOREIGN PATENT DOCUMENTS

| JP | 2012-163442 A | 8/2012 |
|---|---|---|
| JP | 2015-137915 A | 7/2015 |

\* cited by examiner

UP SECTION   DOWN SECTION

FIG. 5

UP SECTION

FIG. 6

UP SECTION          DOWN SECTION

RADAR DEVICE AND SIGNAL PROCESSING METHOD

CROSS-REFERENCE TO RELATED APPLICATIONS

This application is based on and claims priority from Japanese Patent Application No. 2016-122935 filed on Jun. 21, 2016.

TECHNICAL FIELD

The present invention relates to a radar device and a signal processing method.

RELATED ART

In the related art, a technology for improving the accuracy of current target detection of a radar device mounted on a vehicle by an estimating process based on data on targets detected in the previous detection process is known (see Patent Document 1 for instance).

Patent Document 1: Japanese Patent Application Publication No. 2015-137915A

However, the above-described technology has a problem in which targets may not correctly detected in some environments, and thus is required to be further improved.

SUMMARY

It is therefore an object of the present invention to provide a radar device and a signal processing method capable of improving the accuracy of target detection.

According to an aspect of the embodiments of the present invention, there is provided a radar device comprising: an estimating unit configured to estimate peak signals corresponding to a target in the latest periods of each of UP beat sections and DOWN beat sections of a beat signal, as estimate peak signals, on the basis of histories of peak signals corresponding to the target in past periods of the UP beat sections and the DOWN beat sections; and a pairing unit configured to extract peak signals corresponding to the target in each of the UP beat sections and DOWN beat sections, within predetermined ranges defined with reference to the estimate peak signals on the basis of the histories, and pair the extracted peak signals, wherein, in a case where a distance to the target is equal to or shorter than a predetermined value, the pairing unit extracts peak signals corresponding to the target, from a first range which is a predetermined angular range defined with reference to the estimate peak signals, or a second range which is a predetermined transverse position range defined with reference to the estimate peak signals.

According to the present invention, it is possible to provide a radar device and a signal processing method capable of improving the accuracy of target detection.

BRIEF DESCRIPTION OF THE DRAWINGS

Exemplary embodiments of the present invention will be described in detailed based on the following figures, wherein.

DETAILED DESCRIPTION

Hereinafter, an embodiment of a radar device and a signal processing method according to the present invention will be described in detail with reference to the accompanying drawings. However, the present invention is not limited to the following embodiment.

Figure 1:
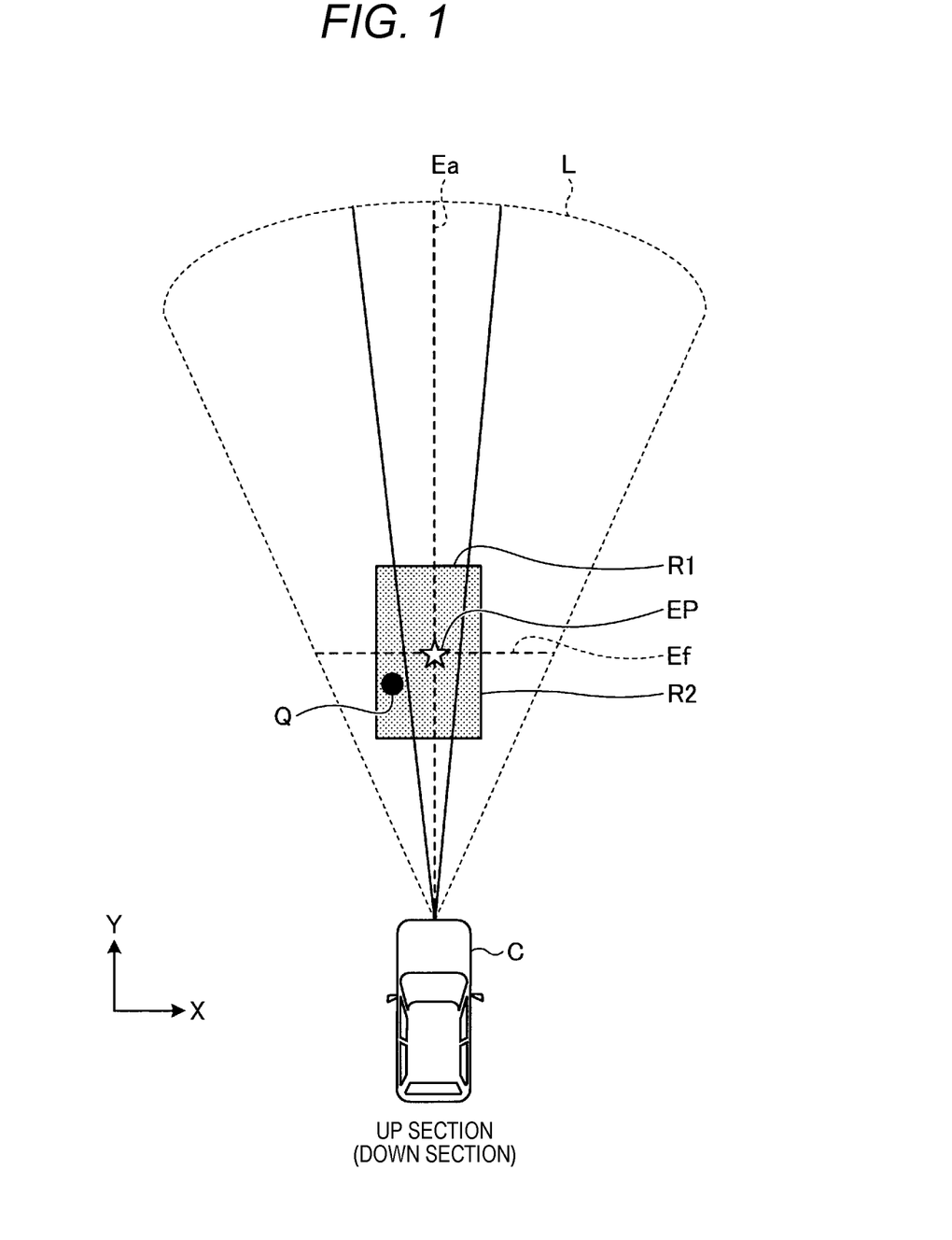
FIG. 1 is a schematic diagram illustrating an overview of a signal processing method according to an embodiment.

First, a signal processing method according to the present embodiment will be described with reference to FIG. 1. FIG. 1 is a schematic diagram for explaining an overview of the signal processing method according to the present embodiment. Also, the signal processing method is performed by a radar device. The radar device is mounted on a vehicle C, and detects targets T existing in front of the vehicle C.

Also, the radar device is a so-called FMCW (frequency-modulated continuous-wave) radar device.

Now, an overview of a signal processing method which is performed by an FMCW radar device will be described. First, the radar device transmits a frequency-modulated transmission wave from a transmitting antenna at predetermined intervals, and receives the reflected waves of the transmission wave from targets T by receiving antennae. In an example shown in FIG. 1, for example, each transmission wave is transmitted toward a front irradiation range L from the vehicle C.

Subsequently, the radar device mixes a transmission signal corresponding to the transmission wave with reception signals corresponding to the reflected waves, thereby generating beat signals. Next, the radar device performs fast Fourier transform (FFT) on each of the UP beat sections (hereinafter, referred to as UP sections) and the DOWN beat sections (hereinafter, referred to as DOWN sections) of the beat signals, thereby generating frequency spectra. Subsequently, the radar device extracts peak frequencies having peak intensities equal to or larger than a predetermined value, from the frequency spectra. Hereinafter, peak intensities of frequency spectra will be referred to as FFT power levels.

Next, with respect to each of the peak frequencies extracted from the UP sections and the DOWN sections, the radar device calculates the incident angle of a reflected wave corresponding to the corresponding peak frequency. Also, the radar device associates the angles and the peak frequencies calculated from the UP sections and the DOWN sections, thereby deriving peak signals.

Next, the radar device pairs the peak signals of the UP sections with the peak signals of the DOWN sections on the basis of a predetermined condition, thereby deriving pairs of data items. Hereinafter, peak signals of UP sections will also be referred to as UP peak signals, and peak signals of DOWN sections will also be referred to as DN peak signals.

Also, the radar device estimates peak signals corresponding to the targets T and included in the latest periods of the UP sections and the DOWN sections, as estimate peak signals EP, on the basis of the histories of peak signals of the past periods corresponding to the targets T. Each of the estimate peak signals EP includes various parameters such as an estimate frequency Ef, an estimate angle Ea, and a transverse estimate position.

Here, a transverse position means a position in a direction substantially perpendicular to the traveling direction of the vehicle C, and can be calculated by a trigonometric function using the frequency of a peak signal and an angle. FIG. 1 is a schematic diagram illustrating the peak position of a peak signal of an UP section (or a DOWN section) corresponding to a target T, and a transverse position corresponds to a coordinate on an X axis shown in FIG. 1. Also, the frequency of a peak signal corresponds to a coordinate on a Y axis shown in FIG. 2, and the coordinate on the Y axis is in inverse proportion to the wavelength of the peak signal.

Next, the radar device pairs the current UP peak signals and the current DN peak signals corresponding to the targets T on the basis of the estimate peak signals EP. In this way, the radar device derives pairs of current data items corresponding to the targets T.

In contrast, for example, a radar device of the related art pairs UP peak signals and DN peak signals as pairs of current data items corresponding to the targets T such that the UP peak signal and DN peak signal of each pair are included in first ranges R1 which are angular ranges defined with reference to corresponding estimate peak signals EP.

Specifically, each first range R1 is defined, for example, by a range of about 4 degrees having the estimate angle Ea of a corresponding estimate peak signal EP as its center and a range of about 6 bins having the estimate frequency Ef of the corresponding estimate peak signal as its center (about 3 bins and about 3 bins on the low frequency side and the high frequency side, respectively) and has, for example, a trapezoid shape as shown in FIG. 1. Here, one bin is about 468 Hz.

In a case where a target T is close to the vehicle C, the peak position of a peak signal corresponding to the target T may be deviated from a corresponding first range R1. The reason is that the transverse position range of a first range R1 corresponding to a target T close to the vehicle C is narrower than that corresponding to a target far from the vehicle C.

For this reason, the radar device of the related art may miss peak signals corresponding to near targets T. If missing a peak signal corresponding to a target T, the radar device performs a process of assuming that a corresponding estimate peak signal EP is a current peak signal corresponding to the target T, thereby securing peak signal continuity of the target T (hereinafter, this process will be referred to as extrapolation). Extrapolation may derive a position different from the actual position of a target T, resulting in loss of the target T.

In contrast, in the signal processing method according to the present embodiment, in a case where a target T is within a predetermined distance, a peak signal corresponding to the target T is extracted from a first range R1 or a second range R2 having a transverse position range defined with reference to an estimate peak signal EP.

For example, as shown in FIG. 1, each second range R2 is set, for example, so as to have a transverse position range wider than that of a corresponding first range R1 and have the same frequency as that of the first range R1. Further, each transverse position range is, for example, between −0.9 m and +0.9 m with reference to the transverse position of a corresponding estimate peak signal EP on the X axis. In other words, each transverse position range is a range of 1.8 m having the transverse position of a corresponding estimate peak signal EP as its center.

In view of the width of a vehicle to be detected as a target T, the transverse position range of a second range R2 is set as described above such that even if the reflecting point of the target T varies, the second range includes a peak signal corresponding to the target T. Also, a case where a target is within a predetermined distance means, for example, a case where the target is within a distance at which the transverse position width of a first range R1 is substantially the same as the transverse position width of a second range R2.

In a case where a current peak signal corresponding to a target T, for example, a peak signal shown in FIG. 1 is at a peak position Q, the radar device of the related art cannot extract the corresponding peak signal, and thus performs extrapolation. In contrast, the radar device according to the present embodiment can extract the peak signal existing at the peak position Q.

In short, even in a case where a peak signal corresponding to a preceding vehicle which is a target T is out of a first range R1, it is possible to extract the corresponding peak signal from a second range R2. It is possible to suppress missing of peaks corresponding to the latest targets T.

As described above, according to the signal processing method of the present embodiment, since it is possible to suppress extrapolation from being performed, it is possible to improve the accuracy of detection on targets T.

Hereinafter, the radar device which performs the signal processing method according to the present embodiment will be further described. Also, in the following description, a case where a target T is a preceding vehicle running in front of the vehicle C will be described.

Figure 2:
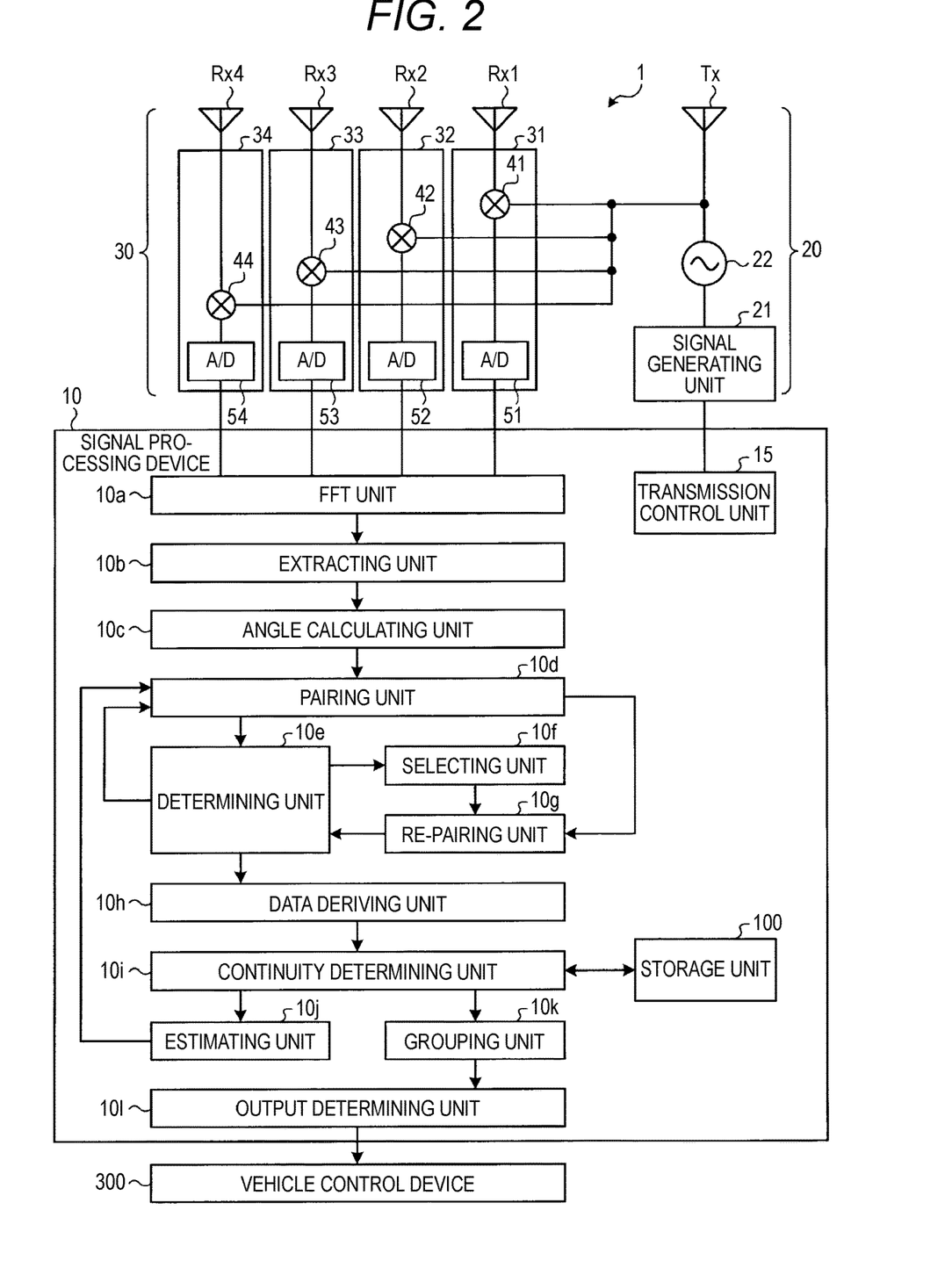
FIG. 2 is a block diagram illustrating the configuration of a radar device according to the embodiment.

FIG. 2 is a view illustrating the radar device 1 according to the embodiment of the present invention. The radar device 1 includes a signal processing device 10, a signal transmitting unit 20, and a signal receiving unit 30. Also, the radar device 1 is connected to a vehicle control device 300.

The vehicle control device 300 controls behavior of the vehicle C by controlling the components of the vehicle C such as the brake and the throttle on the basis of target information items on targets T input from the radar device 1. In other words, in a case of determining that the vehicle C is likely to come into contact with a target on the basis of target information items, the vehicle control device 300 controls behavior of the vehicle C. Target data items are data items including the relative positions (distances, angles, and transverse positions), relative velocities, and so on of targets T to the vehicle C.

The signal transmitting unit 20 includes a signal generating unit 21, an oscillator 22, and a transmitting antenna Tx. The signal generating unit 21 generates modulation signals having a triangular waveform, and supplies the modulation signals to the oscillator 22.

The oscillator 22 performs frequency modulation on continuous-wave signals on the basis of the modulation signals generated by the signal generating unit 21, thereby generating transmission signals, and outputs the transmission signals to the transmitting antenna Tx. The transmitting antenna Tx transmits the transmission signals input from the oscillator 22, as transmission waves, for example, in the traveling direction of the vehicle C.

The signal receiving unit 30 includes, for example, four reception signals Rx1 to Rx4 (hereinafter, collectively referred to as reception signals Rx), and individual signal receiving unit 31 to 34 connected to the reception signals Rx, respectively. The reception signals Rx receive the reflected waves of the transmission waves from targets T, as reception signals.

The individual signal receiving units 31 to 34 include mixers 41 to 44 and A/D conversion units 51 to 54, respectively, and perform various processes on reception signals received through the reception signals Rx. The mixers 41 to 44 mix the reception signals with transmission signals input from the oscillator 22, thereby generating beat signals representing the frequency differences between the reception signals and the transmission signals. The A/D conversion units 51 to 54 convert the beat signals generated by the mixers 41 to 44 into digital signals, and outputs the digital signals to the signal processing device 10.

In the present embodiment, the individual signal receiving units 31 to 34 include the mixers 41 to 44 and the A/D conversion units 51 to 54. However, the present invention is not limited thereto. For example, the individual signal receiving units 31 to 34 may include amplifiers and filters (not shown in the drawings).

The signal processing device 10 is a micro computer including a central processing unit (CPU), a storage unit 100, and so on, and controls the whole of the radar device 1.

Also, the signal processing device 10 includes a transmission control unit 15, an FFT unit 10a, an extracting unit 10b, an angle calculating unit 10c, a pairing unit 10d, a determining unit 10e, a selecting unit 10f, a re-pairing unit 10g, a data deriving unit 10h, a continuity determining unit 10i, an estimating unit 10j, a grouping unit 10, and an output determining unit 10l, as functions which can be implemented in a software wise by the micro computer.

The transmission control unit 15 controls modulation signal generating timings of the signal generating unit 21 of the signal transmitting unit 20, and so on. The FFT unit 10a performs FFT on beat signals output from the individual signal receiving units 31 to 34, thereby converting the beat signals into frequency spectra. The FFT unit 10a outputs the frequency spectra to the extracting unit 10b.

From the frequency spectra, the extracting unit 10b extracts the peak frequencies of the UP sections and the peak frequencies of the DOWN sections. Specifically, from the frequency spectra, the extracting unit 10b extracts, for example, peak frequencies having FFT power levels exceeding a predetermined value. Also, the extracting unit 10b outputs the extracted peak frequencies to the angle calculating unit 10c.

The angle calculating unit 10c calculates the incident angles of reflected waves corresponding to the peak frequencies extracted by the extracting unit 10b, thereby deriving peak signals. Specifically, the angle calculating unit 10c calculates the angle spectra of the peak frequencies extracted by the extracting unit 10b by performing calculation using, for example, ESPRIT (Estimation of Signal Parameters via Rotational Invariance Techniques).

Subsequently, from the calculated angle spectra, the angle calculating unit 10c extracts peak angles having peak intensities (hereinafter, referred to as angle power levels) exceeding a predetermined value. Subsequently, the angle calculating unit 10c derives peak signals by associating the extracted peak angles with the peak frequencies. The peak signals include information on the peak frequencies, the FFT power levels, the angles, and the angle power levels. Subsequently, the angle calculating unit 10c outputs the peak signals to the pairing unit 10d.

The pairing unit 10d pairs the UP peak signals and the DN peak signals, thereby deriving pairs of data items. Subsequently, the pairing unit 10d outputs the pairs of data items to the determining unit 10e. Also, the pairing unit 10d performs another pairing process of pairing peak signals included in first ranges R1 and peak signals out of the first ranges R1.

Hereinafter, a pairing process based on estimate peak signals will be referred to as a history pairing process, and the other pairing process will be referred to simply as a pairing process. Also, pairs of data items derived by a history pairing process will be referred to as pairs of history data items, and pairs of data items derived by a pairing process will be referred to simply as pairs of data items.

First, the pairing process which is performed by the pairing unit 10d will be described. The pairing unit 10d performs pairing of the UP peak signals and the DN peak signals by performing calculation using Mahalanobis distances. The Mahalanobis distance between an UP peak signal and a DN peak signal constituting a pair is in inverse proportion to the appropriateness of the corresponding pair.

Also, the Mahalanobis distance between an UP peak signal and a DN peak signal constituting a pair of data items is calculated from some values such as the FFT power difference, angle difference, and angle power difference between both signals.

The pairing unit 10d performs pairing such that each pair consists of an UP peak signal and a DN peak signal having a minimum Mahalanobis distance, thereby deriving pairs of data items.

Also, the pairing unit 10d establishes pairing of data items having Mahalanobis distances equal to or smaller than a predetermined threshold. The corresponding pair of data items is output to the determining unit 10e. In other words, the pairing unit 10d does not establish pairing of data items having Mahalanobis distance equal to or larger than the predetermined threshold.

Now, the history pairing process which is performed by the pairing unit 10d will be described. In the history pairing process, on the basis of estimate peak signals EP and first ranges R1 input from the estimating unit 10j, the pairing unit 10d derives pairs of current history data items corresponding to targets T.

Specifically, first, the pairing unit 10d extracts UP peak signals and DN peak signals of first ranges R1 from the UP sections and the DOWN sections. At this time, if first ranges R1 corresponding to one target include only one UP peak signal and only one DN peak signal, respectively, the pairing unit 10d pairs the UP peak signal and the DN peak signal, thereby deriving a pair of history data items.

Meanwhile, in a case where first ranges R1 corresponding to one target includes a plurality of UP peak signals or DN peak signals, respectively, the pairing unit 10d pairs an UP peak signal and a DN peak signal closest to estimate peak signals EP included in the first ranges R1, thereby deriving a pair of history data items.

Also, in a case where the distance from the vehicle C and a target T is equal to or smaller than a predetermined value, from first ranges R1 or second ranges R2 corresponding to the target, the pairing unit 10d extracts peak signals of UP sections and DOWN sections, and pairs them.

This is for improving the accuracy of detection on targets T. Also, information items on the second ranges R2 are input from the estimating unit 10*j*. Further, the pairing unit 10*d* outputs the derived pairs of history data items to the determining unit 10*e*.

Also, in a case where a first range R1 or a second range R2 of one of an UP section and a DOWN section has no peak signal, the pairing unit 10*d* uses an estimate peak signal EP of the corresponding section to perform pairing. Specifically, for example, in a case where a first range R1 or a second range R2 of an UP section has no UP peak signal, the pairing unit pairs an estimate peak signal EP of the UP section and a DN peak signal of a corresponding DOWN section.

Subsequently, the pairing unit 10*d* outputs the pairing results, as one-sided pairs of data items to the determining unit 10*e*. Hereinafter, a pairing process of forming pairs each having one estimate peak signal EP will be referred to as one-sided pairing, and peak signals which are used in one-sided pairing will be referred to as one-side peaks. The one-sided pairs of data items are output to the re-pairing unit 10*g*.

The determining unit 10*e* determines whether each pair of history data items is appropriate. Specifically, the determining unit 10*e* determines whether each pair of history data items is appropriate, for example, by calculation using the Mahalanobis distance.

In a case where the Mahalanobis distance of a pair of history data items is equal to or smaller than a predetermined threshold, the determining unit 10*e* outputs the corresponding pair as a pair of normal history data items, to the data deriving unit 10*h*. Meanwhile, in a case where the Mahalanobis distance of a pair of history data items is equal to or larger than the predetermined threshold, the determining unit 10*e* outputs a re-pairing request signal to the pairing unit 10*d*. Also, the determining unit 10*e* performs a process of turning over the pair of data items input from the pairing unit 10*d*, to the data deriving unit 10*h*.

If the pairing unit 10*d* receives a re-pairing request signal relative to a target T which is a preceding vehicle, it performs different re-pairing processes depending on whether there are peak signals corresponding to an adjacent vehicle running in the vicinity of the preceding vehicle in parallel to the preceding vehicle (hereinafter, such peak signals will be referred to as adjacent-vehicle peak signals PZ).

Figure 3A:
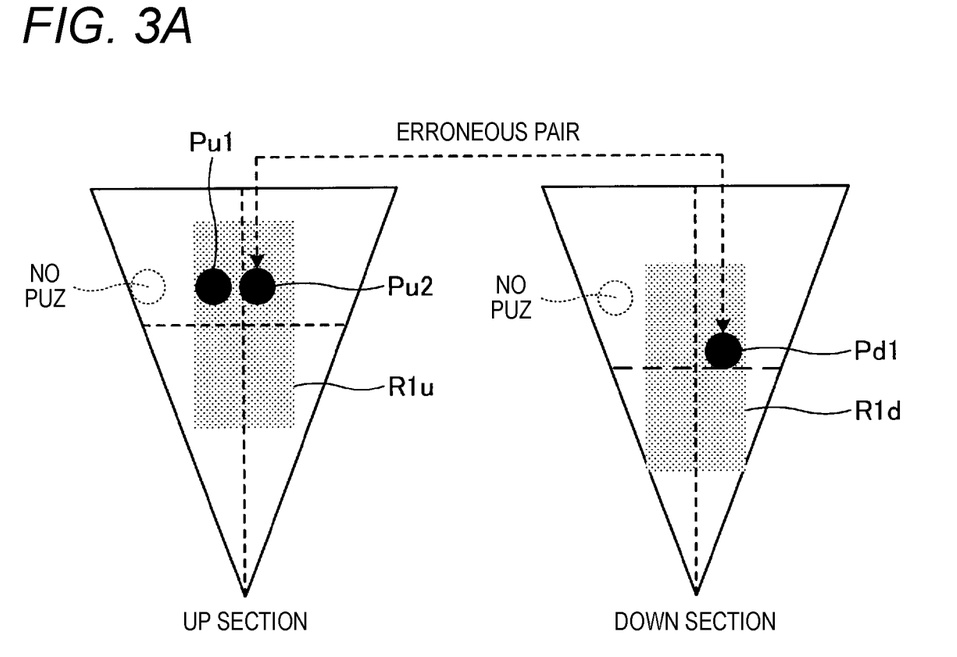
FIG. 3A is a view illustrating a first part of a re-pairing process which is performed by a pairing unit.
Figure 3B:
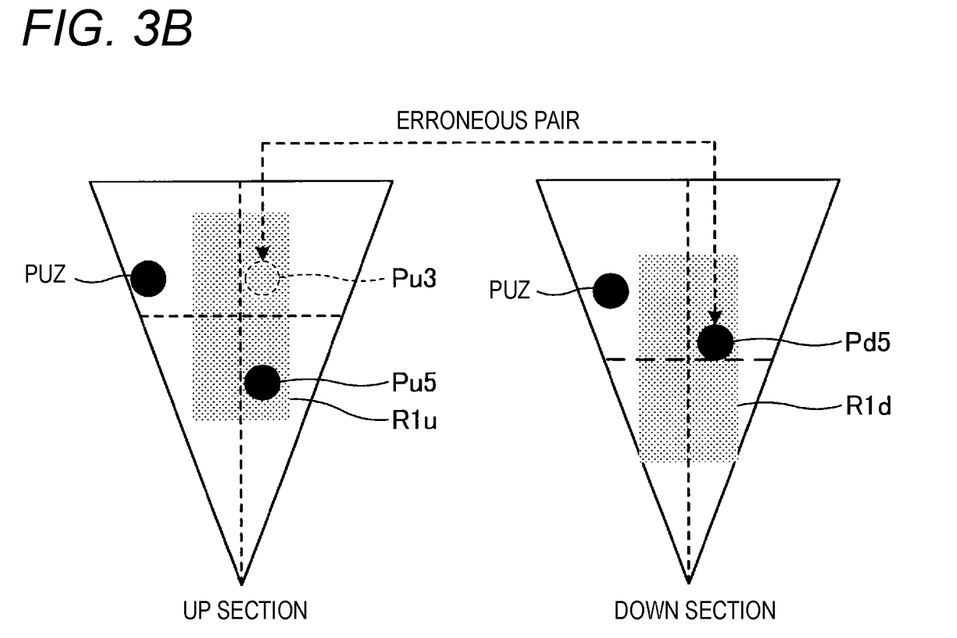
FIG. 3B is a view illustrating a second part of the re-pairing process which is performed by the pairing unit.

Now, re-pairing processes which are performed by the pairing unit 10*d* will be described with reference to FIGS. 3A and 3B. FIGS. 3A and 3B are views for explaining the re-pairing processes which are performed by the pairing unit 10*d*.

First, with reference to FIG. 3A, a re-pairing process which is performed in the case where there is no adjacent-vehicle peak signal PZ will be described. In an example shown in FIG. 3A, a first range R1*u* of an UP section includes an UP peak signal Pu1 and an UP peak signal Pu2. Also, a first range R1*d* of a DOWN section includes a DN peak signal Pd1.

Also, it is assumed that the pairing unit 10*d* has output a pair of history data items corresponding to the UP peak signal Pu2 and the DN peak signal Pd1 to the determining unit 10*e*, and then has received a re-pairing request signal relative to the pair of history data items. As shown in FIG. 3A, in the UP section and the DOWN section, adjacent-vehicle peak signals PuZ and PdZ corresponding to adjacent-vehicle peak signals PZ do not exist.

For this reason, the pairing unit 10*d* performs a re-pairing process using a peak signal having a frequency substantially equal to that of the peak signal constituting the erroneous pair. In other words, the pairing unit uses a peak signal having the same frequency as that of the peak signal of the erroneous pair and having an angle different from that of the peak signal of the erroneous pair. In the example shown in FIG. 3A, the pairing unit re-pairs the DN peak signal Pd1 with the UP peak signal Pu1 having the same frequency as that of the UP peak signal Pu2.

Now, with reference to FIG. 3B, a re-pairing process which is performed in a case where there is an adjacent-vehicle peak signal PZ will be described. In an example shown in FIG. 3B, a first range R1*u* of an UP section includes an UP peak signal Pu3 and an UP peak signal Pu5. Also, a first range R1*d* of a DOWN section includes a DN peak signal Pd5.

Also, it is assumed that the pairing unit 10*d* has output a pair of history data items corresponding to the UP peak signal Pu3 and the DN peak signal Pd5, and then has received a re-pairing request signal relative to the pair of history data items from the determining unit 10*e*.

In FIG. 3B, in the UP section and the DOWN section, adjacent-vehicle peak signals PZ exist, respectively. Therefore, the pairing unit 10*d* performs a re-pairing process using an UP peak signal having different from that of the UP peak signal Pu3.

Specifically, the pairing unit 10*d* re-pairs the DN peak signal Pd5 with the UP peak signal Pu5 having a frequency different from the UP peak signal Pu3. Also, the pairing unit may perform a re-pairing process on an erroneous pair in a case where only one of an UP section and a DOWN section corresponding to that pair has an adjacent-vehicle peak signal PZ.

Figure 3C:
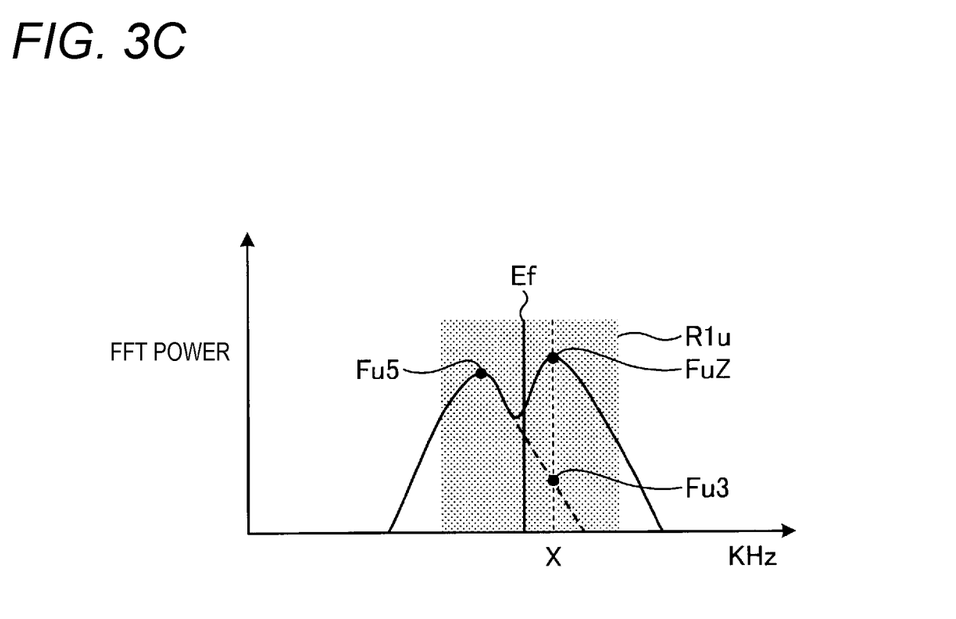
FIG. 3C is a view illustrating a frequency spectrum in a case where there is an adjacent-vehicle peak signal.
Figure 3D:
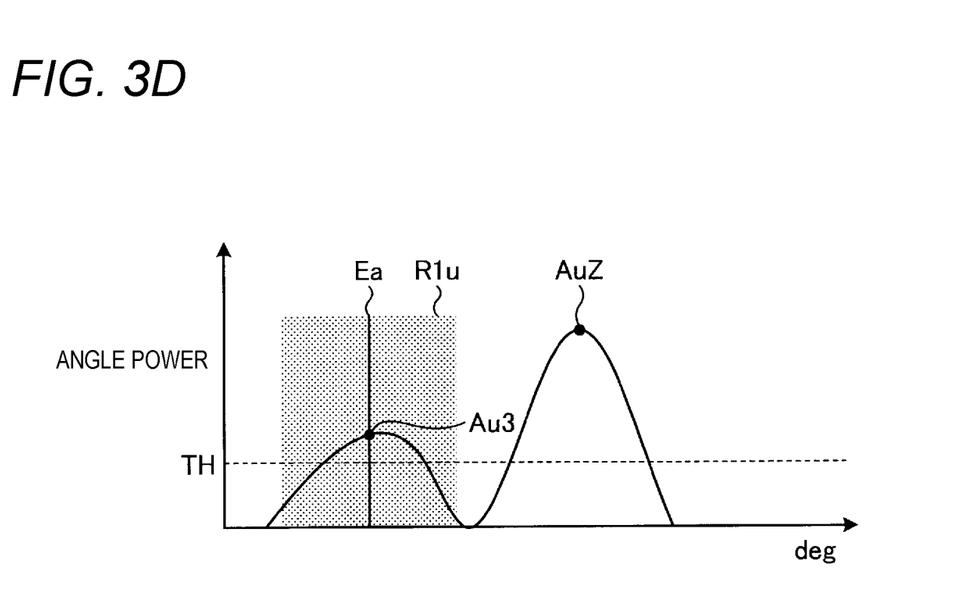
FIG. 3D is a view illustrating an angle spectrum in a case where there is an adjacent-vehicle peak signal.

Now, with reference to FIGS. 3C and 3D, the reason why different re-pairing processes depending on whether adjacent-vehicle peak signals PZ exist will be described. FIG. 3C is a view illustrating a frequency spectrum in a case where there are adjacent-vehicle peak signals PZ. FIG. 3D is a view illustrating an angle spectrum in a case where there are adjacent-vehicle peak signals PZ. The following description will be made on the assumption that the UP peak signal Pu5 and the DN peak signal Pd5 shown in FIG. 3B are a pair of normal history data items.

As shown in FIG. 3C, the frequency spectrum has peaks at a peak frequency Fu5 corresponding to the UP peak signal Pu5 and a peak frequency FuZ corresponding to the adjacent-vehicle peak signal PZ, in the first range R1.

In this case, the extracting unit 10*b* detects the peaks of the frequency spectrum, thereby extracting the peak frequencies. In other words, the extracting unit 10*b* detects the peak corresponding to the peak frequency FuZ and the peak corresponding to the peak frequency Fu5. Meanwhile, in a case where there is no adjacent-vehicle peak signal PuZ, only the peak corresponding to the peak frequency Fu5 is extracted.

Subsequently, the angle calculating unit 10*c* calculates an angle spectrum corresponding to the peak corresponding to the peak frequency FuZ, that is, the frequency of "x" KHz. At this time, even with respect to the peak frequency Fu3 equal to the peak frequency FuZ and corresponding to the UP peak signal Pu3 positioned at the skirt of the spectrum corresponding to the peak frequency Fu5 (in FIG. 3C, a part shown by a broken line), an angle spectrum is calculated. In other words, even with respect to the peak frequency Fu3 which is not a peak in the frequency spectrum, an angle spectrum is calculated.

Subsequently, as shown in FIG. 3D, in the angle spectrum corresponding to the frequency of "x" KHz, since the angle power level of an angle peak Au3 corresponding to the UP peak signal Pu3 exceeds a threshold TH, the angle peak Au3 is extracted by the angle calculating unit 10c.

Therefore, the UP peak signal Pu3 has a peak position shown in FIG. 3B. Meanwhile, in a case where the angle peak Au3 does not exceed the threshold TH, since the angle peak Au3 is not extracted by the angle calculating unit 10c, the UP peak signal Pu3 is not detected by the radar device 1.

In this case, an angle power level (not shown in FIG. 3D) corresponding to the UP peak signal Pu5 is larger than the angle power level of the angle peak Au3. Also, since the angle power level corresponding to the DN peak signal Pd5 of the DOWN section is almost the same as the angle power level corresponding to the UP peak signal Pu5, the angle power difference between the UP peak signal Pu3 and the DN peak signal Pd5 is large, and thus they are determined as an erroneous pair.

In other words, if there is an adjacent-vehicle peak signal PZ, due to the adjacent-vehicle peak signals PZ, an angle spectrum corresponding to a frequency corresponding to the adjacent-vehicle peak signal is unnecessarily calculated, whereby an erroneous pair may occur. In this case, if the angle power level corresponding to the unnecessary peak signal exceeds the threshold TH, the unnecessary peak signal may form a pair. In this case, the pairing result has a large angle power difference and a large angle difference.

Therefore, in a case where there is an adjacent-vehicle peak signal PZ, in a frequency band different from that of the peak signal of the erroneous pair of history data items, another peak signal is likely to exist. Therefore, in the case where there is an adjacent-vehicle peak signal PZ, the pairing unit 10d performs a re-pairing process using a peak signal exiting in a frequency band different from that of the peak signal of the erroneous pair.

As described above, in response to reception of re-pairing request signals, the pairing unit 10d performs re-pairing processes depending on whether there are adjacent-vehicle peak signals PZ. Therefore, it is possible to improve the accuracy of re-pairing processes, and it is possible to improve the accuracy of detection on targets T.

Also, pairs of history data items obtained by re-pairing processes of the pairing unit 10d are output to the determining unit 10e, and the Mahalanobis distances of those pairs are calculated. Subsequently, the determining unit 10e outputs pairs having Mahalanobis distances equal to or smaller than the predetermined threshold, as pairs of normal history data items, to the data deriving unit 10h.

Meanwhile, the detecting unit determines pairs of history data items having Mahalanobis distances equal to or larger than the predetermined threshold, as erroneous pairs, and outputs the erroneous pairs to the selecting unit 10f. Alternatively, in this case, the determining unit 10e may output re-pairing request signals relative to the erroneous pairs of history data items, to the pairing unit 10d.

Referring to FIG. 2 again, the selecting unit 10f will be described. The selecting unit 10f selects one-side peak signals from the UP peak signals and the DN peak signals of the pairs of history data items determined as erroneous pairs by the determining unit 10e.

Figure 4:
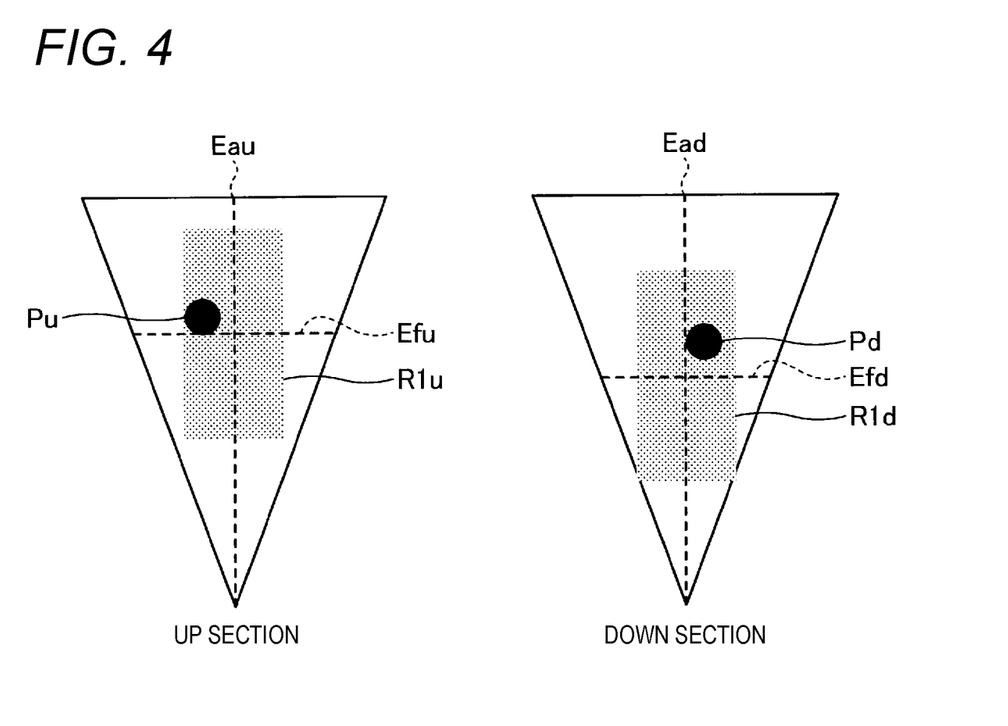
FIG. 4 is a view illustrating a process of a selecting unit.

In other words, the selecting unit 10f selects peak signals having high reliability from the UP peak signals and the DN peak signals. Now, the process of the selecting unit 10f will be described with reference to FIG. 4. FIG. 4 is a view for explaining the selecting process of the selecting unit 10f.

If the selecting unit 10f receives an erroneous pair of data items from the determining unit 10e, it changes a peak signal selection reference on the basis of the angle power difference between the UP peak signal and the DN peak signal of the erroneous pair of data items.

Specifically, in a case where the angle power difference is equal to or smaller than a predetermined value, the selecting unit selects a peak signal closer to the estimate angle Ea of a corresponding estimate peak signal EP, from the UP peak signal and the DN peak signal. In this case, in the example shown in FIG. 4, the distance from a DN peak signal Pd of a DOWN section to an estimate angle Ead of the DOWN section is shorter than the distance from an UP peak signal Pu of an UP section to an estimate angle Eau of the UP section. In other words, the DN peak signal Pd is closer to the corresponding estimate angle Ea than the UP peak signal Pu is. Therefore, the selecting unit 10f selects the DN peak signal Pd.

Meanwhile, in a case where the angle power difference is equal to or larger than the predetermined value, the selecting unit selects a peak closer to the frequency of the estimate peak signal EP, from the UP peak signal and the DN peak signal. In the example shown in FIG. 4, the distance from the UP peak signal Pu of the UP section to an estimate frequency Efu of the UP section is shorter than the distance from the DN peak signal Pd of the DOWN section to an estimate frequency Efd of the DOWN section. In other words, the UP peak signal Pu is closer to the estimate frequency Ef. Therefore, the selecting unit 10f selects the UP peak signal Pu.

As described above, the selecting unit 10f selects different peak signals depending on angle power differences. The reason is that in a case where an angle power difference occurs, a calculated angle is likely to be incorrect, and thus is not reliable. Also, the one-side peak signal selected by the selecting unit 10f is paired with the estimate peak signal by the re-pairing unit 10g (to be described below), and the corresponding pair is input as a one-sided pair of data items to the data deriving unit 10h.

As described above, the selecting unit 10f selects one-side peak signals with high reliability. Therefore, it is possible to improve the reliability of one-sided pairs of data items. As a result, it is possible to improve the accuracy of detection on targets T.

Referring to FIG. 2 again, the re-pairing unit 10g will be described. The re-pairing unit 10g performs a re-pairing process on each one-side peak signal input from the pairing unit 10d and the selecting unit 10f.

Figure 5:
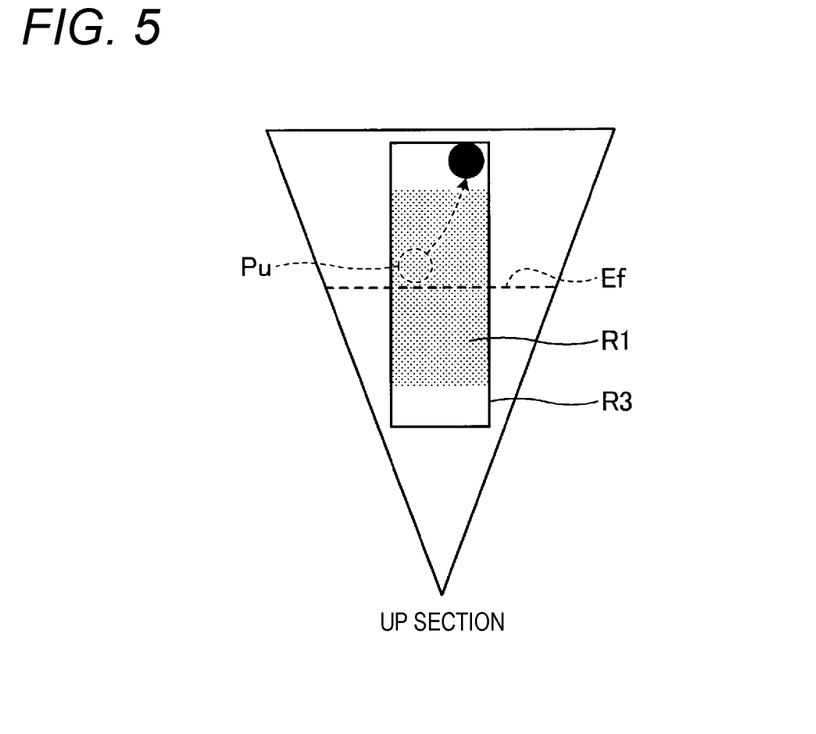
FIG. 5 is a view for explaining a third range.

Now, the process of the re-pairing unit 10g on a one-side peak signal input from the pairing unit 10d will be described with reference to FIG. 5. FIG. 5 is a view for explaining a third range R3. FIG. 5 will be described with respect to a case where a DN peak signal of a DOWN section (not shown in FIG. 5) is a one-side peak signal.

Also, FIG. 5 shows a case where an UP peak signal Pu existing in a first range R1 of an UP section is embedded in another peak signal and thus is not detected. In this case, in a state where the UP peak signal Pu has not been detected, that is, in a state where extrapolation such as one-sided pairing has been performed, the relative velocity of a target T corresponding to the UP peak signal Pu may vary.

For example, in a case where the UP peak signal Pu moves along a trajectory shown by a broken-line arrow in FIG. 5, the UP peak signal Pu deviates from the first range R1. In this case, even if the moved UP peak signal Pu is detected, it is omitted from objects of the history pairing process of the pairing unit 10d.

Therefore, in a case where the re-pairing unit 10g receives a one-side peak signal, it performs a history pairing process using a peak signal existing in a third range R3 which is an expansion of the first range R1.

Also, as shown in FIG. 5, the third range R3 is, for example, a range defined by a transverse position range substantially the same as that of the first range R1 and a frequency range which is an expansion of the first range R1. For example, the third range R3 is a range of 10 bins having the estimate frequency Ef of the estimate peak signal EP as its center (5 bins on each side of the low frequency side and the high frequency side).

The re-pairing unit 10g pairs the DN peak signal which is a one-side peak signal with each of peak signals existing in the third range R3 which is an expansion of the first range R1 in the frequency domain, and outputs all of the pairs of history data items to the determining unit 10e.

If receiving all of the pairs of history data items, the determining unit 10e calculates the Mahalanobis distance of each pair of history data items. In a case where there is a pair of history data items having a Mahalanobis distance equal to or smaller than a predetermined threshold, the detecting unit determines the corresponding pair of history data items as a pair of normal history data items.

Meanwhile, in a case where there is no pair of history data items having a Mahalanobis distance equal to or smaller than the predetermined threshold, the determining unit 10e outputs the one-sided pair of data items received from the pairing unit 10d, to the data deriving unit 10h.

Also, in this case, the re-pairing unit 10g pairs the one-side peak signal received from the selecting unit 10f with the estimate peak signal, and outputs the derived one-sided pair of data items to the data deriving unit 10h through the determining unit 10e.

As described above, the re-pairing unit 10g performs a history pairing process on the one-side peak signal and each UP peak signal existing in the third range R3 which is an expansion of the first range R1. Therefore, even in a case where the relative velocity of the target T varies, whereby the UP peak signal Pu deviates from the first range R1 when extrapolation such as one-sided pairing is being performed, it is possible to perform a history pairing process using a peak signal of the target T. Therefore, it is possible to improve tracking performance on targets T during one-sided pairing.

Also, in the above-described example, the DN peak signal is a one-side peak. However, even in a case where an UP peak signal is a one-side peak, an identical process is performed on a DOWN section.

Referring to FIG. 2 again, the data deriving unit 10h will be described. The data deriving unit 10h calculates target information items such as the positions, velocities, and so on of targets T on the basis of pairs of data items and pairs of history data items (including one-sided pairs of data items) received from the determining unit 10e.

With respect to each of the pairs of history data items, the data deriving unit 10h calculates the distance to a corresponding target T, from the sum of the frequencies of the UP peak signal and the DN peak signal. Also, the data deriving unit 10h calculates the relative velocity of the corresponding target T from the frequency difference between the UP peak signal and the DN peak signal.

Then, the data deriving unit 10h outputs the derived target information items, to the continuity determining unit 10i, in association with the corresponding pairs of data items and the corresponding pairs of history data items. At this time, in a case where a one-sided pair of data items is included as a pair of history data items, the data deriving unit 10h switches on a one-sided pair flag corresponding to the one-sided pair, and outputs the one-sided pair to the continuity determining unit 10i.

The continuity determining unit 10i determines whether each pair of data items received in the current process has temporal continuity with any pair of data items received in the previous process. Specifically, the continuity determining unit 10i compares the longitudinal distance difference, transverse distance difference, and relative velocity difference between each pair of data items received in the current process and each pair of data items received in the previous process with predetermined values. In a case where those differences between the current pair and a previous pair are equal to or smaller than the predetermined values, the continuity determining unit determines that both pairs of data items have continuity.

In this case, the continuity determining unit determines that a corresponding target T derived in the current process and a corresponding target T derived in the past process are the same target. Meanwhile, if a pair of data items is determined as having no continuity, the continuity determining unit determines the corresponding pair as a new pair of data items derived for the first time in the current process. It is assumed that the pairs of data items derived in the previous process and having continuity are stored in the storage unit 100.

Also, the continuity determining unit 10i performs the above-described process on the pairs of history data items. The continuity determining unit 10i determines, for example, pairs of history data items determined as having no continuity, as new pairs of data items.

Subsequently, the continuity determining unit 10i outputs pairs of history data items determined as having continuity, to the estimating unit 10j. Also, the continuity determining unit 10i outputs the pairs of history data items and the pairs of data items to the grouping unit 10k.

The estimating unit 10j estimates estimate peak signals corresponding to the targets T and included in the latest periods of the UP sections and the DOWN sections, on the basis of the histories of peak signals of the past periods corresponding to the targets T.

Specifically, first, the estimating unit 10j performs the reverse process of the process of deriving pairs of data items by pairing peak signals, thereby deriving the peak signals from the pairs of data items obtained in the previous process.

Subsequently, from the previous peak signals, the estimating unit 10j derives estimate peak signals EP of current peak signals. In other words, from the pairs of previous data items, the estimating unit 10j derives previous UP peak signals and previous DN peak signals.

Subsequently, the estimating unit 10j derives estimate UP peak signals of current UP peak signals from the previous UP peak signals, and derives estimate DN peak signals of current DN peak signals from the previous DN peak signals.

Then, the estimating unit 10j calculates first ranges R1 and second ranges R2 of the UP section and the DOWN section on the basis of the estimated estimate peak signals EP, and outputs the information on the calculated first ranges R1 and the calculated second ranges R2 to the pairing unit 10d.

The grouping unit 10k performs a process of integrating a plurality of pairs of history data items corresponding to one target T into one pair. Specifically, if a plurality of pairs of history data items has substantially the same relative velocity and has longitudinal distances and transverse distances within predetermined ranges, the grouping unit 10k regards a plurality of target information items corresponding to those pairs as pairs of history data items of the same target T.

Then, the grouping unit performs a grouping process of integrating the plurality of pairs of history data items into one pair of history data items corresponding to one target. Subsequently, the grouping unit 10k outputs the pair of history data items obtained by grouping, to the output determining unit 10l.

The output determining unit 10l determines whether to output target information items based on each pair of data items to the vehicle control device 300. Specifically, the output determining unit 10l determines the reliability of each one-sided pair of data items, and outputs pairs of history data items such as one-sided pairs of data items determined as having high reliability, to the vehicle control device 300. The output determining unit 10l determines the reliability of each pair of history data items having a one-sided pair flag set in the ON state.

The output determining unit 10l determines the reliability of each one-sided pair of data items, for example, by two different determining methods. The two determining methods are a determining method on one-side peak signals of one-sided pairs of data items, and a determining method based on pairs of data items other than one-sided pairs of data items. Also, it is assumed that the two determining methods are performed whenever the output determining unit 10l receives a one-sided pair of data items.

Figure 6:
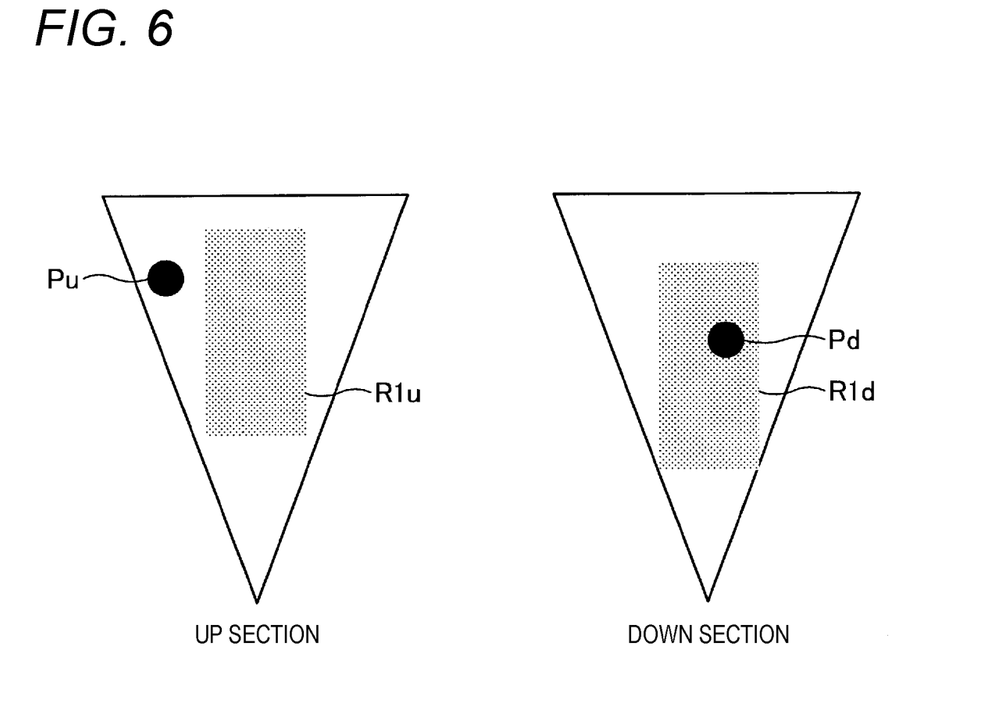
FIG. 6 is a view illustrating a first part of a determining process which is performed by an output determining unit.
Figure 7:
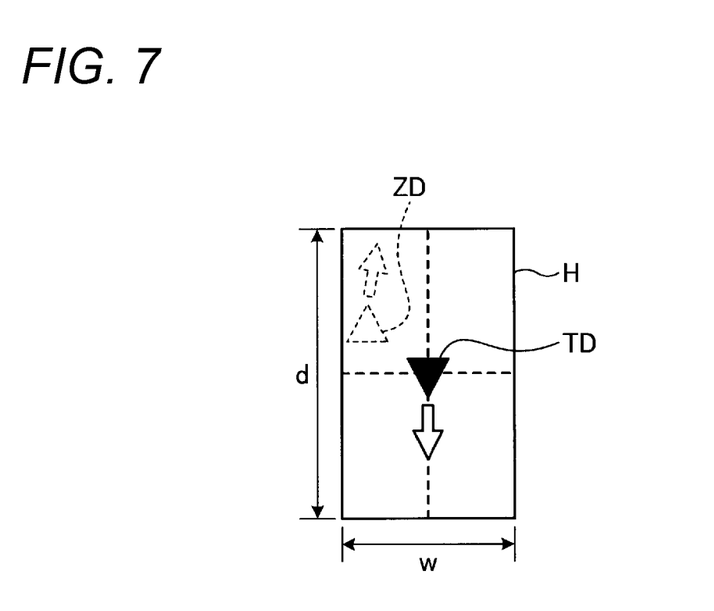
FIG. 7 is a view illustrating a second part of the determining process which is performed by the output determining unit.

Now, with reference to FIG. 6, determination which is performed on peak signals of a one-sided pair of data items by the output determining unit 10l will be described. FIGS. 6 and 7 are views for explaining the determining process which is performed by the output determining unit 10l.

A case where a one-side peak signal of the one-sided pair of data items is a DN peak signal Pd of a DOWN section shown in FIG. 6 will be described. In this case, the output determining unit 10l derives a pair of history data items with respect to the DN peak signal Pd and each UP peak signal of the UP section. Subsequently, with respect to each derived pair of history data items, the output determining unit 10l derives a Mahalanobis distance.

In a case where the Mahalanobis distance of a pair of data items of the DN peak signal Pd and an UP peak signal Pu shown in FIG. 6 is equal to or smaller than a predetermined threshold, since a possibility that a pair of data items of the DN peak signal Pd with the UP peak signal Pu out of a corresponding first range R1 has not been established is high, the reliability of the one-sided pair of data items is low.

Meanwhile, in a case where the derived Mahalanobis distance is equal to or larger than a predetermined threshold, pairing of the DN peak signal Pd with any other UP peak signal is not established. Therefore, an UP peak signal which should form a pair of history data items with the DN peak signal Pd is likely to be embedded in another UP peak signal. For this reason, in this case, the output determining unit 10l increases the reliability of the one-sided pair of data items.

Now, with reference to FIG. 7, a determining process based on one-sided pair of data items and anther pair of data items of the output determining unit 10l will be described. It is assumed that a one-sided pair of data items TD as shown in FIG. 7 has been derived. The one-sided pair of data items TD shows a case where a corresponding target moves in such a direction that the relative velocity of the target to the vehicle C decreases, that is, toward the vehicle C.

In this case, if a pair of data items ZD having a relative velocity different from that of the one-sided pair of data items TD exists in a range H shown in FIG. 7, the output determining unit 10l decreases the one-sided pair of data items TD.

Here, the range H is, for example, a range having the one-sided pair of data items TD as its center and having a transverse width w of 1.8 meters and a longitudinal width d of 10 meters. The transverse width w is set to be substantially the same as the width of the vehicle. Therefore, if it is assumed that a target T corresponding to the one-sided pair of data items TD is a preceding vehicle, it can be considered that another target having a relative velocity different from that of the preceding vehicle exists in the range where there is the preceding vehicle.

Therefore, in this case, the output determining unit 10l decreases the reliability of the one-sided pair of data items TD. Meanwhile, in a case where there is no pair of data items having a different relative velocity in the range H, the output determining unit increases the reliability of the one-sided pair of data items TD. Alternatively, in a case where the range H includes a pair of data items having substantially the same relative velocity as that of the one-sided pair of data items TD, the output determining unit may increase the reliability of the one-sided pair of data items TD.

Further, the output determining unit 10l stores the determined reliability as a cumulative value. In a case where the reliability of the one-sided pair of data items TD is equal to or larger than a predetermined value, the output determining unit outputs the one-sided pair of data items TD to the vehicle control device 300; whereas in a case where the reliability of the one-sided pair of data items TD is equal to or smaller than the predetermined value, the output determining unit does not output the one-sided pair of data items TD to the vehicle control device 300.

As described above, the output determining unit 10l determines the reliability of each one-sided pair of data items TD, and outputs target information items based on one-sided pairs of data items TD having high reliability to the vehicle control device 300. In this way, in a case where the reliability of a one-sided pair of data items TD is high, it is possible to lengthen an extrapolation time.

Also, the output determining unit 10l does not output target information items based on one-sided pairs of data items TD having low reliability to the vehicle control device 300. Therefore, it is also possible to prevent malfunction of the vehicle control device 300 attributable to target information items based on one-sided pairs of data items TD having low reliability.

The storage unit 100 stores information items to be used in the processes of the individual units of the signal processing device 10, and stores the process results of the individual units. The storage unit 100 is, for example, erasable programmable read only memory (EPROM), a flash memory, or the like.

Figure 8:
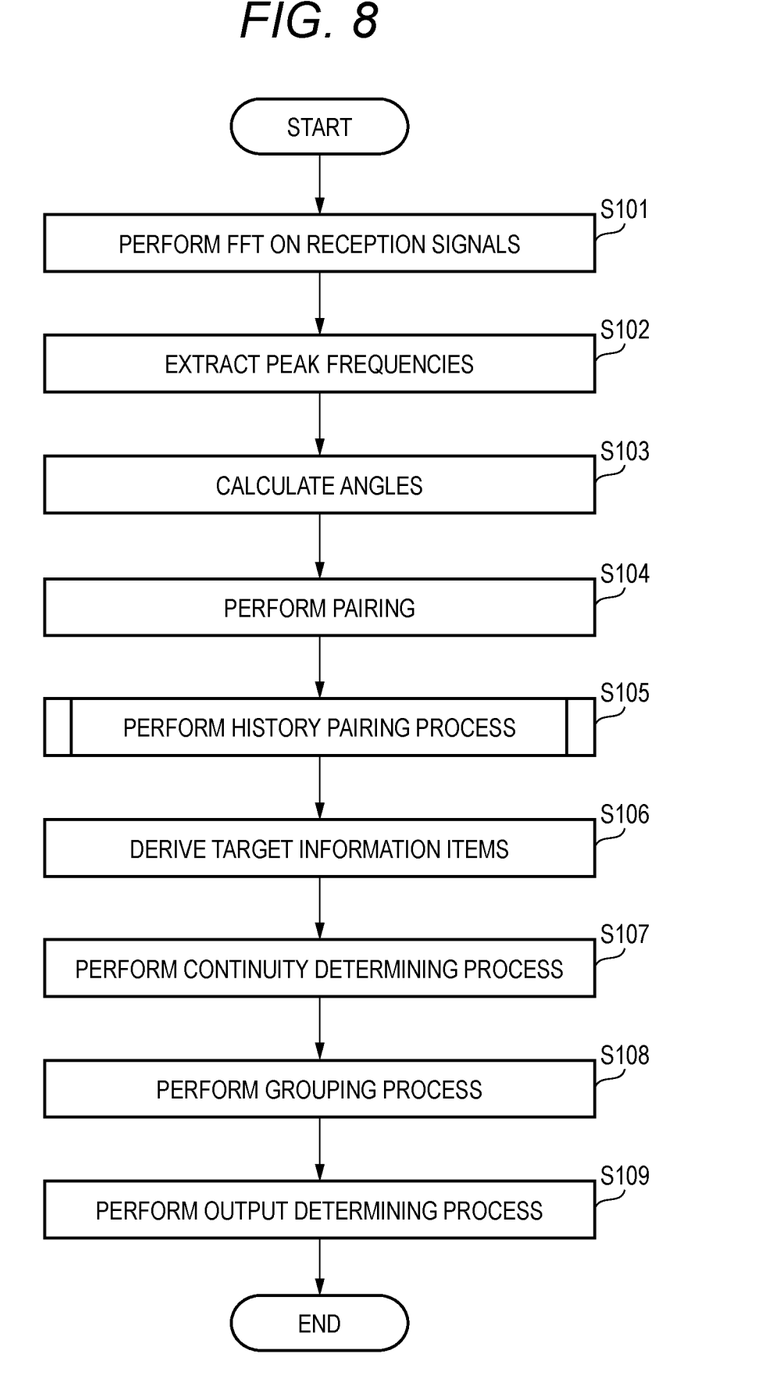
FIG. 8 is a flow chart illustrating the procedure of processes of the radar device according to the embodiment.

Now, with reference to FIG. 8, the procedure of processes which are performed by the radar device 1 according to the present embodiment will be described. FIG. 8 is a flow chart of the procedure of the processes of the radar device 1 according to the present embodiment. Also, those processes are repeatedly performed by the signal processing device 10 of the radar device 1.

As shown in FIG. 8, in STEP S101, the FFT unit 10a performs FFT on reception signals. Subsequently, in STEP S102, the extracting unit 10b extracts peak frequencies from frequency spectra obtained by performing FFT.

Next, in STEP S103, the angle calculating unit 10c calculates angles with respect to the peak frequencies extracted by the extracting unit 10*b*. Subsequently, in STEP S104, the pairing unit 10*d* pairs UP peak signals and DN peak signals.

Next, in STEP S105, the pairing unit 10*d* performs a history pairing process on the UP peak signals and the DN peak signals on the basis of estimate peak signals EP. Alternatively, the pairing unit 10*d* may perform the process of STEP S104 and the process of STEP S105 in parallel, or may perform the process of STEP S104 after the process of STEP S105.

Next, in STEP S106, the data deriving unit 10*h* derives target information items on the basis of the pairs of data items and the pairs of history data items. Subsequently, in STEP S107, the continuity determining unit 10*i* performs a continuity determining process on the pairs of data items received in the current process and the pairs of data items received in the previous process.

Next, in STEP S108, the grouping unit 10*k* performs a grouping process of integrating pairs of data items corresponding to the same target T into one pair. Subsequently, in STEP S109, the output determining unit 10*l* determines the reliability of each of one-sided pairs of data items, thereby determining whether to output the corresponding one-sided pair of data items. Then, the procedure finishes.

Figure 9:
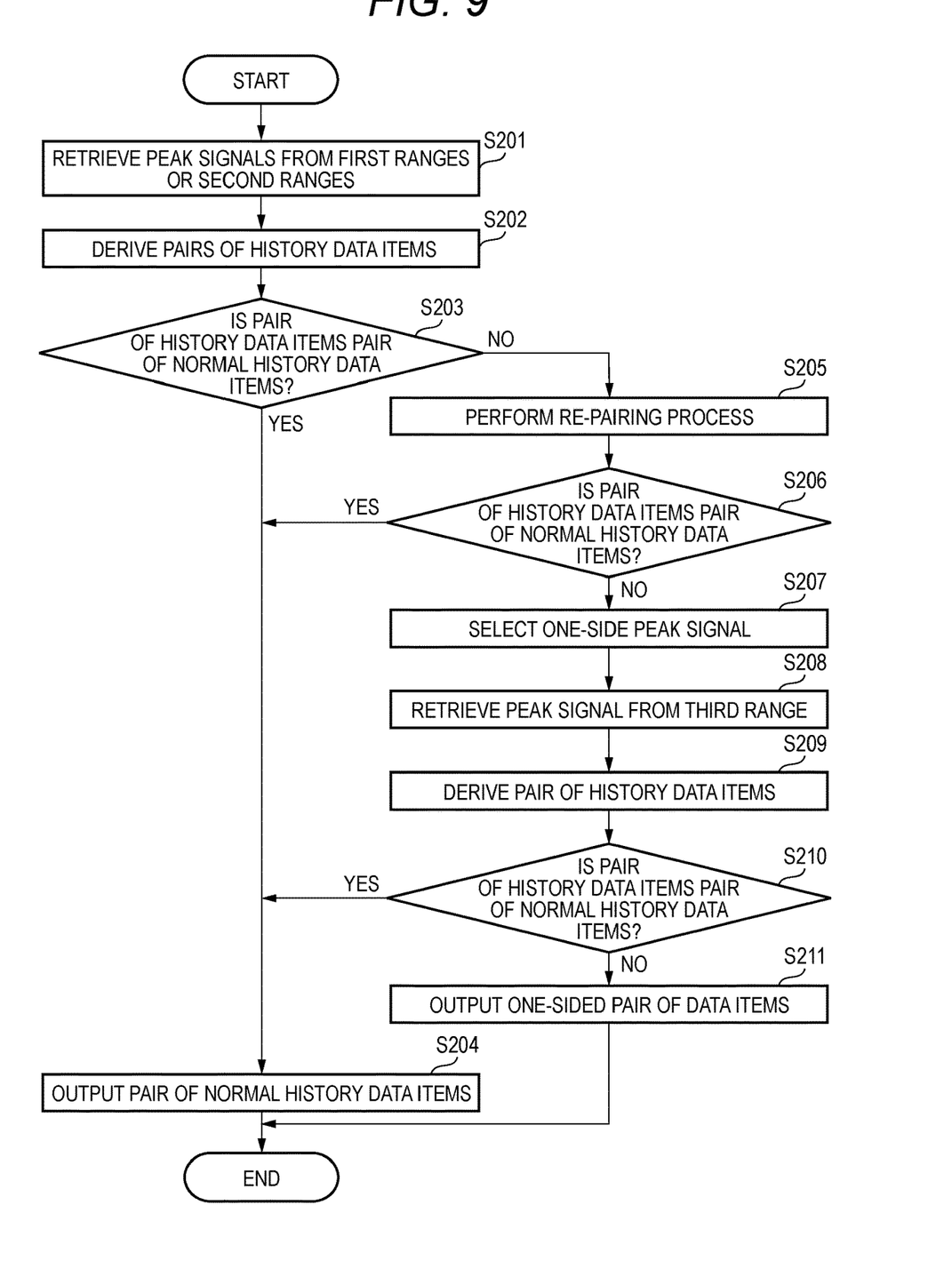
FIG. 9 is a flow chart illustrating the procedure of a history pairing process according to the embodiment.

Subsequently, the procedure of the history pairing process of STEP S105 will be described with reference to FIG. 9. FIG. 9 is a flow chart illustrating the procedure of the history pairing process. The history pairing process is performed by the pairing unit 10*d*, the determining unit 10*e*, the selecting unit 10*f*, and the re-pairing unit 10*g*.

As shown in FIG. 9, first, in STEP S201, the pairing unit 10*d* retrieves peak signals from first ranges R1 or second ranges R2 with respect to UP sections and DOWN sections.

Next, in STEP S102, the pairing unit 10*d* derives pairs of history data items of the UP peak signals and the DN peak signals of the first ranges R1 or the second ranges R2. Subsequently, in STEP S203, with respect to each of the pairs of history data items derived by the history pairing, the determining unit 10*e* determines whether the corresponding pair is a pair of normal history data items.

In a case where it is determined in STEP S203 that a pair of history data items is a pair of normal history data items ("Yes" in STEP S203), in STEP S204, the determining unit outputs the pair of normal history data items to the data deriving unit 10*h*. Then, the history pairing process finishes.

Meanwhile, in a case where it is determined in STEP S203 that the corresponding pair of history data items is not a pair of normal history data items ("No" in STEP S203), the determining unit 10*e* outputs a re-pairing request signal. Then, in STEP S205, the pairing unit 10*d* performs a re-pairing process.

Next, in STEP S206, the determining unit 10*e* determines whether the pair of history data items derived by re-pairing process is a pair of normal history data items. In a case where it is determined in STEP S206 that the pair of history data items is a pair of normal history data items ("Yes" in STEP S206), the process of STEP S204 and the subsequent processes are performed.

Meanwhile, in a case where it is determined in STEP S206 that the pair of history data items is not a pair of normal history data items ("No" in STEP S206), in STEP S207, the selecting unit 10*f* selects a one-side peak signal from the pair of history data items. Subsequently, in STEP S208, the re-pairing unit 10*g* retrieves a peak signal from a third range R3 of a section different from the section of the one-side peak signal.

Next, in STEP S209, the re-pairing unit 10*g* pairs the peak signal of the third range R3 with the one-side peak signal, thereby deriving a pair of history data items. Subsequently, in STEP S210, the determining unit 10*e* determines whether the pair of history data items derived by STEP S209 is a pair of normal history data items.

In a case where it is determined in STEP S210 that the pair of history data items is a pair of normal history data items ("Yes" in STEP S210), the process of STEP S204 and the subsequent processes are performed. Meanwhile, in a case where it is determined in STEP S210 that the pair of history data items is not a pair of normal history data items ("No" in STEP S210), in STEP S211, the determining unit 10*e* outputs the one-sided pair of data items to the data deriving unit 10*h*. Then, the history pairing process finishes.

As described above, the radar device 1 according to the present embodiment includes the estimating unit 10*j* and the pairing unit 10*d*. The estimating unit 10*j* estimates peak signals corresponding to the targets T and included in the latest periods of the UP beat sections and the DOWN beat sections, as estimate peak signals EP, on the basis of the histories of peak signals of the past periods corresponding to the targets T. In each of the UP beat sections and the DOWN beat sections, the pairing unit 10*d* extracts peak signals corresponding to the targets T from predetermined ranges based on the estimate peak signals EP on the basis of the histories, and pairs the extracted peak signals. Also, in a case where the distance to a target T is equal to or shorter than the predetermined value, the pairing unit 10*d* extracts a peak signal corresponding to the target T from a first range R1 which is a predetermined angular range defined with reference to the angle of an estimate peak signal EP or a second range R2 which is a predetermined transverse position range defined with reference to the estimate peak signal EP.

Therefore, according to the radar device 1 of the present embodiment, it is possible to improve the accuracy of detection on targets T.

Various advantages and modifications can be easily achieved by those skilled in the art. Therefore, the invention in its broader aspects is not limited to the specific details and representative embodiments shown and described above. Accordingly, various modifications may be made without departing from the spirit or scope of the general inventive concept as defined by the appended claims and their equivalents.

What is claimed is:

1. A radar device comprising:
   a transmitting antenna configured to transmit a frequency-modulated transmission wave at predetermined intervals;
   a receiving antenna configured to receive a reflected wave of the transmission wave from a target; and
   a processor configured to:
   estimate peak signals corresponding to the target in latest periods of each of UP beat sections and DOWN beat sections of a beat signal, as estimate peak signals, based on histories of peak signals corresponding to the target in past periods of the UP beat sections and the DOWN beat sections;
   extract peak signals corresponding to the target in each of the UP beat sections and DOWN beat sections, within predetermined ranges defined with reference to the estimate peak signals based on the histories, and pair the extracted peak signals; and
   in a case where a distance to the target is equal to or shorter than a predetermined value, extract peak signals corresponding to the target from both of: a first range which is a predetermined angular range defined with reference to the estimate peak signals; and a second range which is a predetermined transverse position range defined with reference to the estimate peak signals.

2. The radar device according to claim 1, wherein the processor is further configured to:

determine whether a result of the pairing is appropriate; and in a case where the it is determined that the result of the pairing is not appropriate, perform a pairing using a peak signal having a frequency different from a frequency of one of the peak signals which have been used in the pairing in one of the UP beat section and the DOWN beat section.

3. The radar device according to claim 2, wherein the processor is further configured to:

in a case where it is determined that the result of the pairing is not appropriate, select a peak signal which is close to the estimate peak signals from the peak signals of the pairing;

pair the selected peak signal in one of the UP beat section and the DOWN beat section and one of the estimate peak signals of the other of the UP beat section and the DOWN beat section;

in a case where the difference between signal intensities corresponding to angles of the peak signals of the pairing is equal to or larger than a predetermined value, select a peak signal which is close to an angle of the estimate peak signals; and in a case where the difference between the signal intensities is smaller than the predetermined value, select a peak signal which is close to a frequency of the estimate peak signals.

4. The radar device according to claim 3, wherein the processor is further configured to:

in a case where no peak signal exists in the first range of one of the UP beat section and the DOWN beat section, perform pairing using the estimate peak signals of the one of the UP beat section and the DOWN beat section; and in a case where the estimate peak signals are included in one of a pair obtained by the pairing, if a peak signal is extracted from a third range which includes an entirety of the first range and is an expansion an angular range of the first range, a transverse position range of the first range, and a frequency range of the first range, in the one of the UP beat section and the DOWN beat section, perform a re-pairing using the extracted peak signal.

5. The radar device according to claim 4, wherein the processor is further configured to:

determine whether to output, from the radar device to an external device, at least one of a relative position and a relative velocity of the target to the radar device corresponding to a result of the pairing using the estimate peak signals in a first one of the pair; and in a case where a paring of all of the peak signals in the one of the UP beat section and the DOWN beat section with the peak signal of a second one of the pair is not established, determine to output the information items.

6. The radar device according to claim 5, wherein the processor is further configured to:

with respect to the result of the pairing using the estimate peak signals, determine whether any other result of the paring representing a different relative velocity exists in a predetermined range; and in a case where there is no other result of the paring, determine to output the information items from the radar device.

7. A signal processing method comprising:

transmitting, using a transmitting antenna, a frequency-modulated transmission wave at predetermined intervals;

receiving, using a receiving antenna, a reflected wave of the transmission wave from a target;

estimating, using a processor, peak signals corresponding to a target in the latest periods of each of UP beat sections and DOWN beat sections of a beat signal, as estimate peak signals, based on histories of peak signals corresponding to the target in past periods of the UP beat sections and the DOWN beat sections;

extracting, using the processor, peak signals corresponding to the target in each of the UP beat sections and DOWN beat sections, within predetermined ranges defined with reference to the estimate peak signals based on the histories, and pairing the extracted peak signals; and in a case where a distance to the target is equal to or shorter than a predetermined value, extracting, using the processor, peak signals corresponding to the target, from both of: a first range which is a predetermined angular range defined with reference to the estimate peak signals; and a second range which is a predetermined transverse position range defined with reference to the estimate peak signals.

* * * * *